(12) United States Patent
Shapiro et al.

(10) Patent No.: US 9,760,916 B1
(45) Date of Patent: Sep. 12, 2017

(54) METHODS AND SYSTEMS FOR INTERNET DISTRIBUTION OF AGGREGATED MEDIA ACTIONS

(75) Inventors: Daniel J. Shapiro, Seattle, WA (US); Charles B. Zapata, Redmond, WA (US); Michael Arcuri, Seattle, WA (US)

(73) Assignee: Photobucket Corporation, Seattle, WA (US)

( * ) Notice: Subject to any disclaimer, the term of this patent is extended or adjusted under 35 U.S.C. 154(b) by 286 days.

(21) Appl. No.: 12/780,535

(22) Filed: May 14, 2010

Related U.S. Application Data

(60) Provisional application No. 61/180,038, filed on May 20, 2009.

(51) Int. Cl.
*G06Q 30/06* (2012.01)

(52) U.S. Cl.
CPC ......... *G06Q 30/06* (2013.01); *G06Q 30/0601* (2013.01); *G06Q 30/0641* (2013.01)

(58) Field of Classification Search
CPC ............... H04L 29/08072; H04L 29/06; H04L 29/08135; H04L 29/08144; H04L 29/0809; H04L 29/08648; H04L 29/08981; H04L 29/06047; H04L 29/06027; H04L 12/581; H04L 29/06034; G06Q 30/02; G06Q 10/10; G06Q 30/06; G06Q 30/0623; G06Q 30/0625; G06Q 30/0633; G06Q 30/0641; G06Q 50/188
USPC .......... 709/217–219, 201, 205, 202
See application file for complete search history.

(56) References Cited

U.S. PATENT DOCUMENTS

| | | | | |
|---|---|---|---|---|
| 6,574,606 | B1 * | 6/2003 | Bell | G06Q 30/02 705/14.27 |
| 2002/0002515 | A1 * | 1/2002 | Okazaki | G06Q 30/0621 705/26.5 |
| 2002/0029252 | A1 * | 3/2002 | Segan et al. | 709/217 |
| 2003/0140120 | A1 * | 7/2003 | Hartman | 709/219 |
| 2003/0210429 | A1 * | 11/2003 | Yamashita | 358/1.18 |

(Continued)

*Primary Examiner* — Abdullahi E Salad
(74) *Attorney, Agent, or Firm* — Norton Rose Fulbright US LLP

(57) ABSTRACT

One aspect of the concepts presented herein is aggregation and presentation of useful actions for digital media in general and photographs in particular, coupled with federated distribution of this collection of media actions such as printing and storing. In one embodiment, code is provided for use on any website such that media content on supported professional websites, amateur blogs, or even the entire Internet, is presented with an expanded and consistent set of options that the viewing user can exercise. With a minor update to the code for a particular website, website owners can offer a full suite of media actions and immediately begin earning revenue generated from the use of these actions. The code is set such that sites that offer media services over the Internet can obtain instant distribution and additional consumers for their services. The code is, in one embodiment, distributed by a service that makes this all possible by allowing for account management, measurement of usage, reporting, and control of the presentation so that the Internet image interface continues to improve in terms of end user benefit thereby increasing revenue for website hosts, content owners, and the service provider (such as printing) company as well.

4 Claims, 7 Drawing Sheets

(56) References Cited

U.S. PATENT DOCUMENTS

| | | | |
|---|---|---|---|
| 2004/0168184 A1* | 8/2004 | Steenkamp et al. | 725/31 |
| 2005/0114672 A1* | 5/2005 | Duncan et al. | 713/182 |
| 2006/0218052 A1* | 9/2006 | Haynes et al. | G06Q 30/06 705/26.61 |
| 2007/0150457 A1* | 6/2007 | Goldman | G06F 17/30716 |
| 2008/0004949 A1* | 1/2008 | Flake et al. | 705/14 |
| 2008/0046974 A1* | 2/2008 | Minodier et al. | 726/4 |
| 2008/0065649 A1* | 3/2008 | Smiler | 707/10 |
| 2008/0288270 A1* | 11/2008 | Lee | 705/1 |
| 2009/0133130 A1* | 5/2009 | Kovalick | 726/28 |
| 2009/0144264 A1* | 6/2009 | Singh | G06F 17/30867 |
| 2009/0164606 A1* | 6/2009 | Epifania et al. | 709/219 |
| 2009/0210512 A1* | 8/2009 | Steinhart | H04N 1/00132 709/218 |
| 2010/0138517 A1* | 6/2010 | De Los Reyes et al. | 709/218 |
| 2010/0241500 A1* | 9/2010 | Milone | 705/14.11 |
| 2014/0310602 A1* | 10/2014 | Jones et al. | 715/735 |

\* cited by examiner

METHODS AND SYSTEMS FOR INTERNET DISTRIBUTION OF AGGREGATED MEDIA ACTIONS

CROSS-REFERENCE TO RELATED APPLICATIONS

This application claims the benefit of U.S. Provisional Application 61/180,038 filed on May 20, 2009, the disclosure of which is incorporated herein by reference.

TECHNICAL FIELD

This disclosure relates to client and server Internet software and more particularly to systems and methods for allowing a server (such as a website) or a client program (such as a web browser) to present a richer view of media content and an aggregated set of actions for working with that content.

BACKGROUND OF THE INVENTION

The Internet is a rich medium, filled not only with text, but with graphics and diagrams, photographs, videos, audio clips, and other media types. In particular, graphics such as photographs, logos, diagrams and other images, appear almost everywhere on the Internet. Graphics are included with almost every story listed on news websites and blogs. They show up throughout online storefronts as depictions of physical products that can be purchased and shipped to your house. They are on company websites depicting the corporate brand or otherwise lending impact to the presentation.

At the same time that images have become an indispensable part of the design of websites, an ever increasing volume of images are created, contributed, and stored on websites on behalf of individuals who do not own the website. These images are referred to as user-generated content, or UGC, to distinguish them from content generated by the website owner, designer, or creator, or content that is professionally produced and distributed, such as stock photography. Photographs of friends, family, pets, vacations, and anything else one can imagine are stored online for safety, archiving, or to be easily shared with other people.

For a given image, there is at least one rights owner who can grant permission to individuals using the photograph to make further use of it, for example to print it. There is also a website operator who can facilitate that action, for example by providing a print button. And finally there is a viewer, who may be interested in taking some action pertaining to a given image.

By way of example, think of photographs stored in an online album website such as Photobucket.com. Depending on the online album website chosen by the content creator, the actions that can be taken with those photographs by a visitor to the website vary according to rules set by the website manager and/or the rights owner of the selected image. The photographs may or may not be easily printable in full resolution and with high quality settings on a home printer. There may or may not be a straightforward way to order 4×6 or 5×7 prints and have them mailed to a home address. There may or may not be a way to order an article, such as a calendar or a mug, bearing the image.

Now consider each party involved. To enable a given capability, for example the ordering of prints of a photograph, a great deal of work must be done. The company hosting the website (host) must do development work to add the option of ordering prints, and the host must establish a business relationship with the print provider. The host must also decide which images on their site should be able to be ordered as prints, based on factors such as image resolution and the rights granted to the host and/or to the entity requesting the print by the image owner (rights owner).

The rights owner, meanwhile, may want to monetize a particular image through charging on a per print basis, or may wish to prohibit such actions. There is no easy way for the rights owner to notify the website owner of those preferences programmatically. If the parties agree on a usage, then they must arrange a billing relationship so the host and the rights owner can be paid for their respective contributions. The rights owner may also want reports on how their image is used, which puts an onus back on the hosting company to provide that functionality.

The fulfillment vendor who is creating the prints receives requests from each photograph hosting company, each of which results in a separate business transaction, such as billing and technical integration.

The viewer and purchaser then must deal with a user experience that is different on every website. The viewer may have to enter billing information—even if they've done so already on other UGC websites. Each website may have a different fulfillment vendor, resulting in different product results. The viewers do not have a consistent set of choices available when they want to perform an action on media, especially when such actions might be charged for. Even seemingly "basic" options such as high quality printing may not be readily available in many cases.

BRIEF SUMMARY OF THE INVENTION

One aspect of the concepts presented herein is aggregation and presentation of useful actions for digital media in general and photographs in particular, coupled with federated distribution of this collection of media actions such as printing and storing. In one embodiment, code is provided for use on any website such that media content on supported professional websites, amateur blogs, or even the entire Internet, is presented with an expanded and consistent set of options that the viewing user can exercise. With a minor update to the code for a particular website, website owners can offer a full suite of media actions and immediately begin earning revenue generated from the use of these actions. The code is set such that sites that offer media services over the Internet can obtain instant distribution and additional consumers for their services. The code is, in one embodiment, distributed by a service that makes this all possible by allowing for account management, measurement of usage, reporting, and control of the presentation so that the Internet image interface continues to improve in terms of end user benefit thereby increasing revenue for website hosts, content owners, and the service provider (such as printing) company as well.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
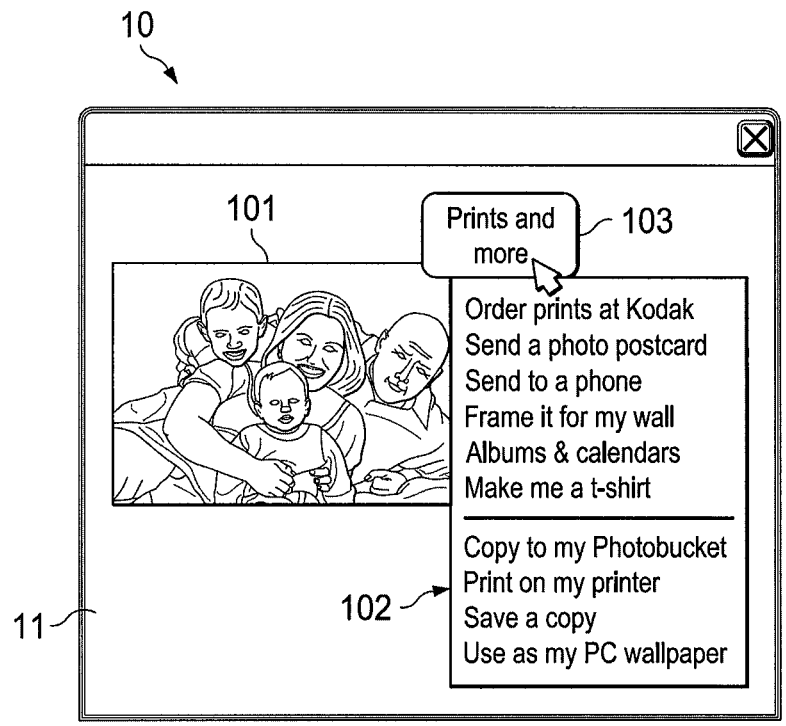
FIG. 1 shows one embodiment of examples of aggregated actions that are possible with respect to a photograph appearing in a web browser.

FIG. 1 shows one embodiment 10 of examples of aggregated actions 102 that are possible with respect to photograph 101 appearing in web browser 11. A button, such as button 103, is attached to each photograph and that button opens a menu of actions that can be taken by a user by moving a cursor, or using a touch (or by any other selection mechanism) directly on the media viewed on that page.

Figure 2A:
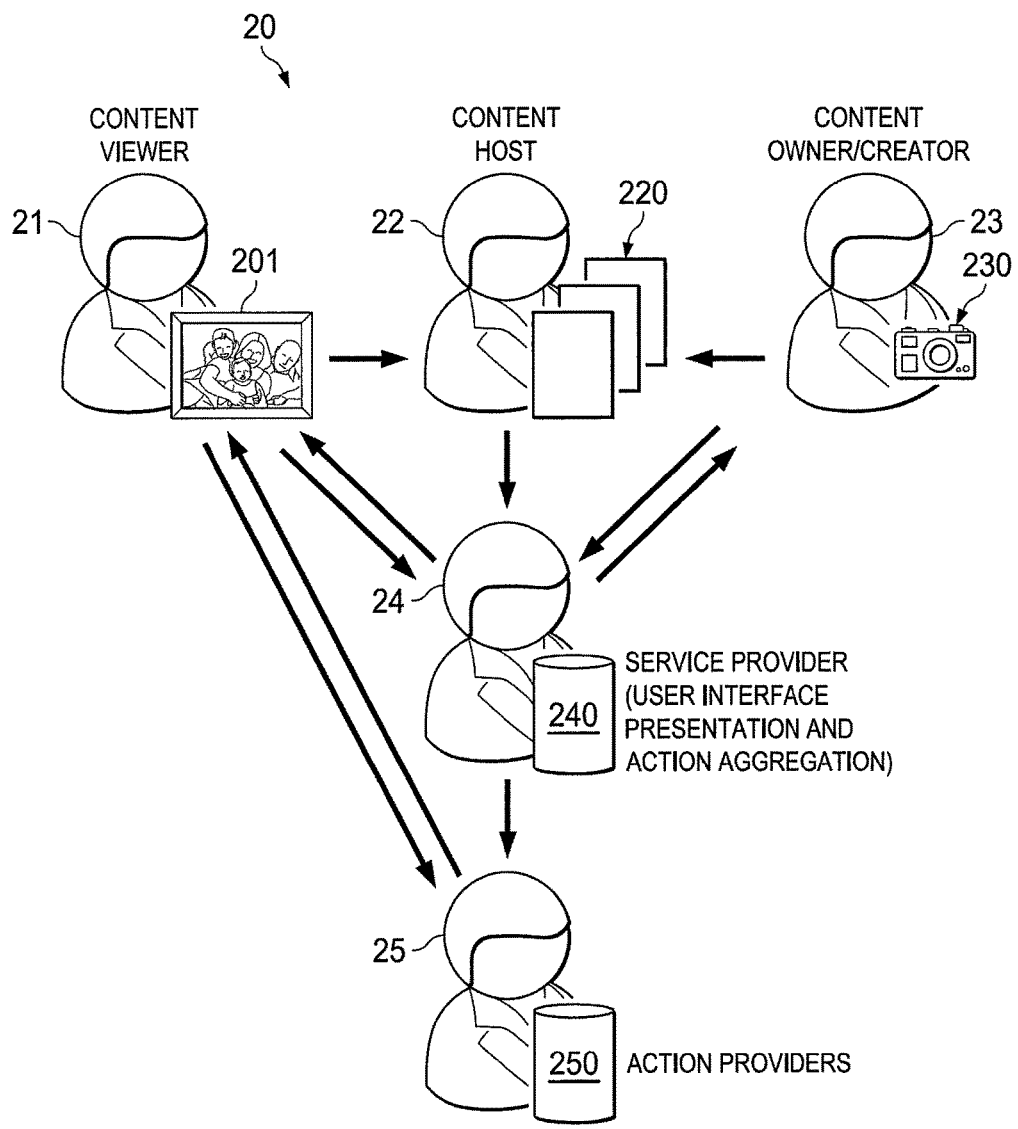
FIG. 2A shows one embodiment of the parties potentially involved in the system.

FIG. 2A shows one embodiment 20 of the parties potentially involved in the system. Assume a piece of media, such as image 201, is embedded somewhere, such as on a web page. Content viewer 21 represents any end user who comes across media enhanced by the invention, for example while browsing the Internet (not shown). Content host 22 is the entity that controls the content that is being viewed by viewer 21 (and perhaps others simultaneously). In this example, image 201 would be stored in files 220 stored in one or more databases controlled, at least in part, buy host 21.

Content owner/creator 23 is an entity that controls the rights to media 201. For a home photograph, it's usually the person who uploaded the photograph, perhaps from camera 230, to the website controlled by host 22. In other cases, the media rights may be owned by a news agency, professional artist, or corporation.

Service provider 24 is the entity that makes the web service available to provide the enhanced media user interface, forms the business relationships and ensures that technical integration exists with other Internet services that provide actions for the media. Service provider 24 provides the code from database 240 and a processor (not shown) for controlling the system operation uniform across multiple hosts, providers, viewers and rights owners.

Action providers 25 (typically, there will be several of these) provide actions or services with respect to images. These actions/services could be for example, photo-printing, DVD-burning, notifications, etc.

Figure 2B:
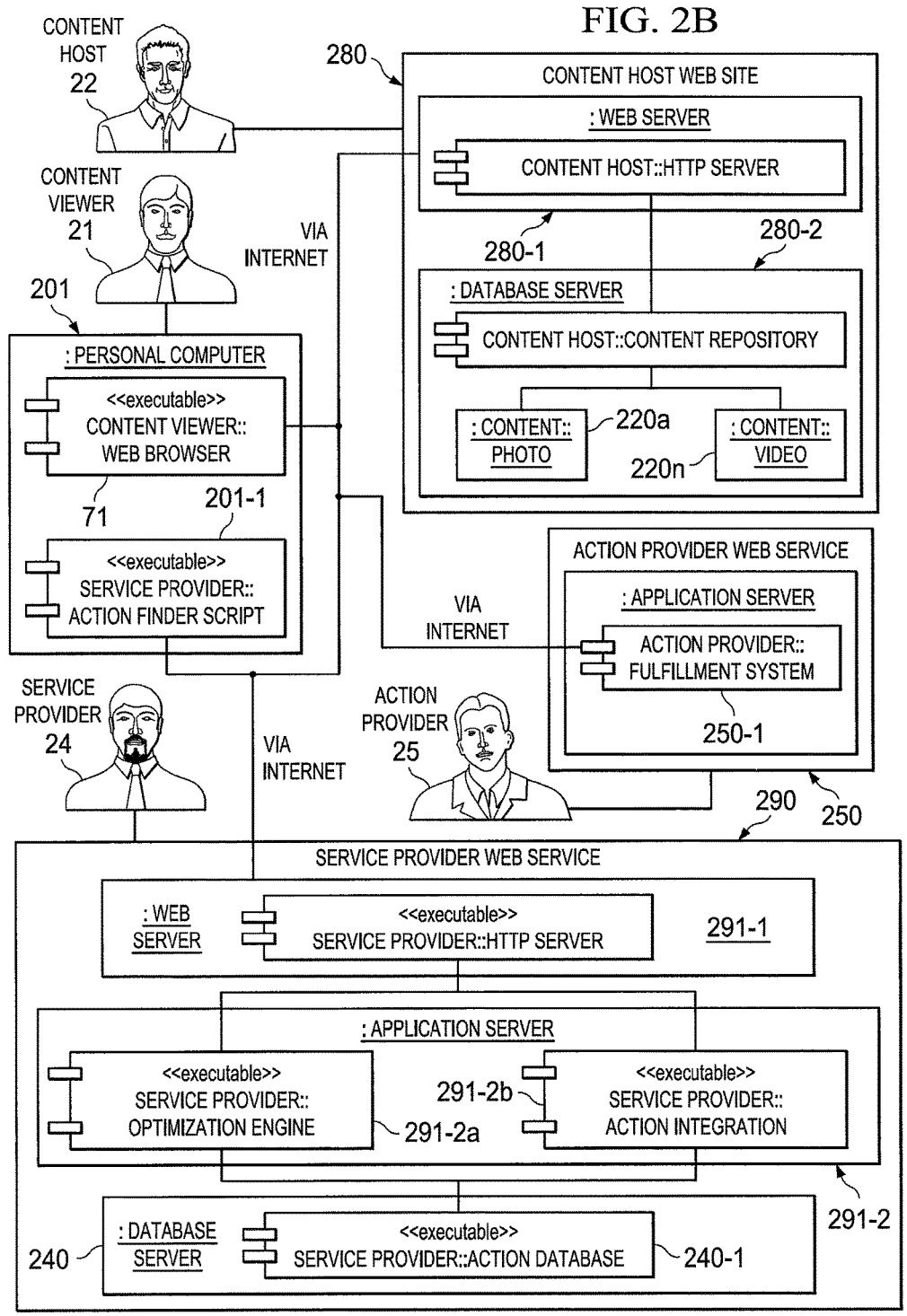
FIG. 2B depicts one embodiment of the physical architecture controlling the implementation discussed herein; it maps to FIG. 2A.

FIG. 2B is an expanded view of FIG. 2A and it shows, for one embodiment, content viewer 21 using PC 201 which contains, for example, web browser 71 and action finder script 201-1.

Content host 22 controls content website 280 which contains, for example, HTTP server 280-1, content repository 280-2 which in turn stores content such as photos 220$a$ and video 220$b$.

Service provider 24 controls web service 290 which contains, for example, HTTP server 291-1, application server 291-2 (containing optimization engine 291-2$a$ and action integration 291-2$b$) and database server 240 with action database 240-1.

Action provider 25 controls web service 250 which contains fulfillment system 250-1. Note that any of the elements of this system shown in FIG. 2B can be expanded to include other operations consistent with the discussion herein.

Figure 3:
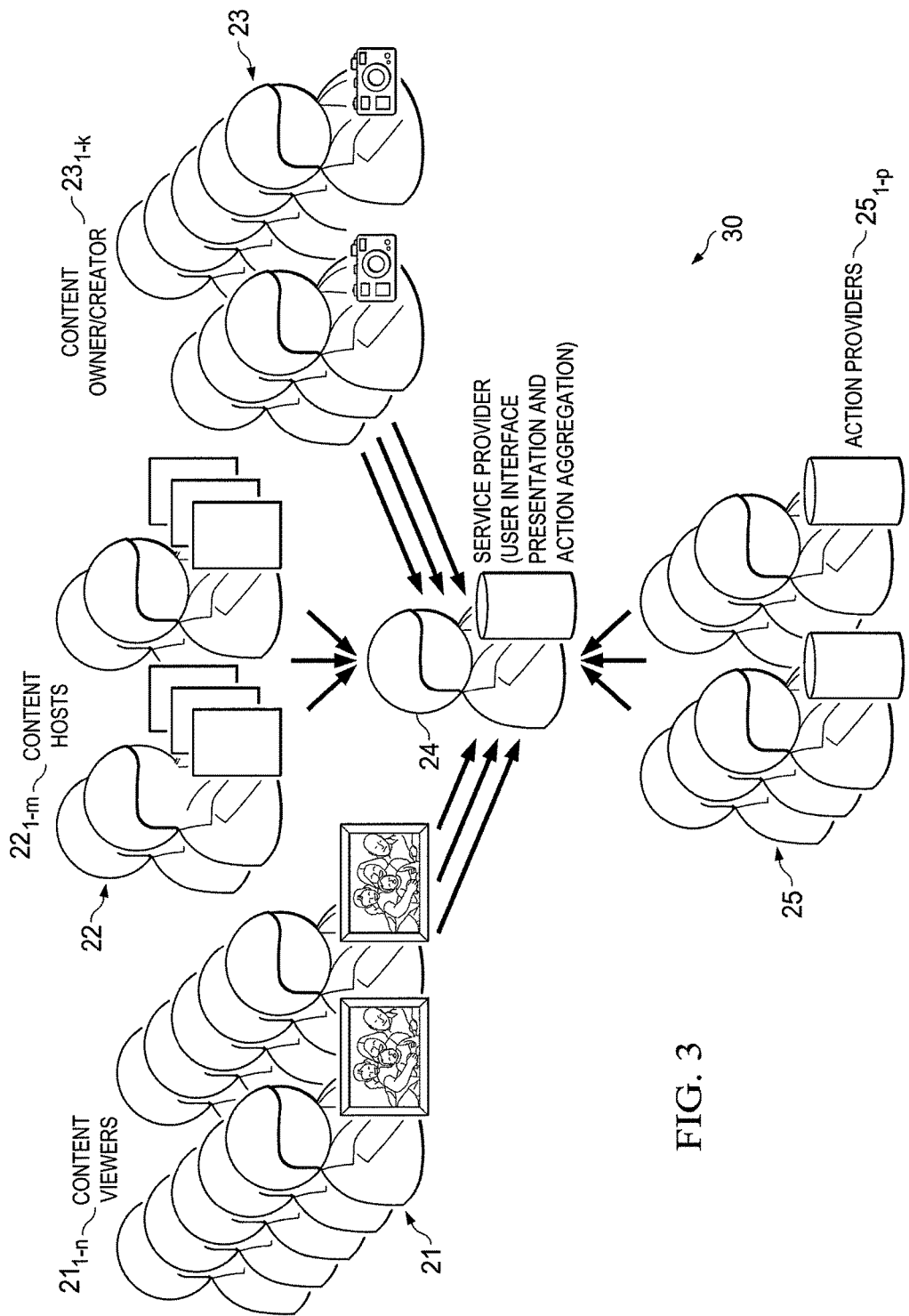
FIG. 3 shows an expanded view of interparty relationships.

FIG. 3 shows an expanded view of the interparty relationships to illustrate the one-to-many nature of each of these relationships. Note that, at least as envisioned, only service provider 24 is a singular entity, and all other parties in the system may have one or many instances.

Returning to FIG. 2A, in one embodiment, content host 22 creates an online account with service provider 24. During the account creation process, the content host provides information so that it may receive payments from viewers and/or rights owners and then forward those onto service provider 24. This is accomplished, in one embodiment, by the use of tokens that are uniquely identifiable to the service provider (e.g., a referral identifier). The content host then adds codes to the web pages on their website, for example through page templates. These codes are downloaded from service provider 24 via the Internet or wirelessly.

Specific images that a rights owner allows users to take action on are marked, for instance by adding an additional property (as specified by service provider 24). As an example, photographs might be so marked, while a company logo might not. The code added to the web pages is provided by service provider 24 and customized uniquely with the aforementioned token for the content host's account. These codes create an enhanced display, or user interface (UI), such as display 102, FIG. 1, for all images tagged in this way on all the pages of the content host's website for all content viewers ($21_{1-n}$ in FIG. 3).

Each time the web page is rendered for a viewer, the images are displayed with the enhanced photograph UI as defined by the service provider. In the context of this invention, the display icon is on the user's device, such as device 71, which could be a computer, cell phone, camera or any other device having processing capability. The display of the photograph itself, the context menu of commands made available by the user's web browser (for example by hovering the mouse over the photograph), and any additional user interface elements (e.g., additional text or links with content information or actions to be taken with the content) may all be provided by the service provider, implemented via the included code and an Internet connection.

Media actions chosen by the content viewer will in many cases cause external calls from the service provider's Internet service to the Internet services of the action providers ($25_{1-p}$). For example an "order prints" action may be fulfilled by KodakGallery.com, and a "create a coffee mug" action could be fulfilled by QOOP.com.

This describes one embodiment of the invention, but those skilled in the art will understand that this invention could be implemented through different means. For example, an ActiveX control or Adobe Flash program could be distributed to the content hosts to achieve a similar experience. It could be distributed as a client-side library (e.g., a DLL) for use by client applications. The code that controls the uniform application for all users can be run on one or more computers, or servers, and, if desired can also run cell phones and other hand-held devices, all under processor control.

Let's walk through an example of someone adopting the concepts taught herein. Without the invention, a professional comic strip artist draws new comics several times a week and posts his/her comics online for viewers at his/her own website. The comic strip artist also sells the rights to redistribute the copyrighted material to major newspapers. Some income comes from the agreements in place with these newspapers. But sizeable income also comes from sales of several different t-shirts depicting "classic" comic strips from the last several years. The artist has an agreement in place with a t-shirt manufacturing company, and has a prominent link on his/her own comic website to the "Store" which sends people to the artist's line of merchandise on a different company's website. Some t-shirts sell better than others, and in cases that a t-shirt model doesn't sell well at all it is pulled from the inventory after a period of time. In this example, the artist fulfills the roles of content owner (23) and content host (22) for his/her comic strip website 280 (FIG. 2B). Newspapers that republish his/her comic online on their own websites (280) also fulfill the roles of content host (22).

Now consider what happens when artist 22 makes use of the invention. First, the artist makes updates to his/her website that augment every single comic strip image on the website with the service provider's enhanced user interface code. The artist creates an account with service provider (24) as both the content owner (23) and the content host (22). The artist then sets a few prices for various actions that will apply to his/her comic strips. For example, full-page print outs for home or office will cost $0.50, t-shirts created with any comic strip on them will cost $17, sending a strip to someone's cell phone as an MMS message will cost $1.99, and ten comics can be set up on a rotation as the user's computer screen saver for $3. The artist will earn a portion of all these transactions, after the cost of the merchandise is paid to the action provider (25) and a transaction fee goes to the service provider (24). After the artist makes the website adjustments, all comic strips in the whole online archive have a richer experience made available to all visitors.

After the first week, the artist realizes that he/she is making more money from full-page prints than he/she ever made on t-shirt sales based on his/her previous business relationship and hand-picked shirt designs. After the second week, he/she realizes that four strips which have never been run as t-shirts in the past are now the top t-shirt prints by volume. By the third week, the comic is on the phone with each of the newspapers that distribute his/her comics, asking them to implement the same invention, i.e., use the same interface code, in their redistributions of his/her comic strips as he/she does. He/she tells them that they will receive the content host's cut of all transactions initiated from their websites.

Figure 7:
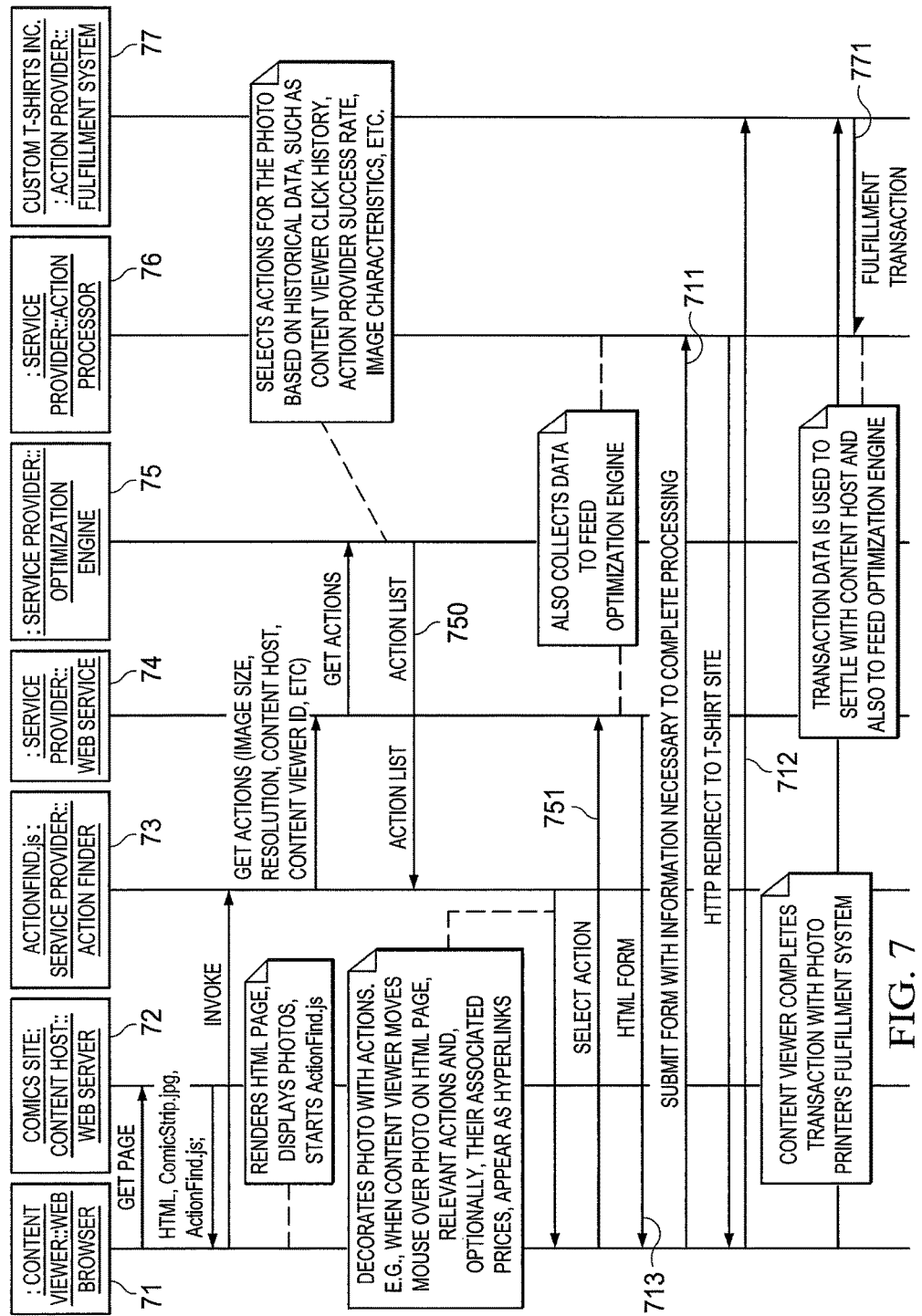
FIG. 7 shows a sequence diagram depicting the interaction among some of the components of the invention as a content viewer utilizes the system to find and take action on an image.

FIG. 7 depicts technical details embodied in one potential implementation for the comic artist's web site, when the comic artist is acting as content host 22. In particular, it displays the interaction that occurs when a content viewer utilizes the invention, as exposed through the comic artist's web site. As described above, the comic artist has already readied his/her site to use the invention. The content viewer 21 uses a web browser 71 that is capable of executing JavaScript. When the content viewer 21 browses the comic artist's web site, the content artist's web server 72 returns a web page pointing to comic strip digital images, as well as ActionFind.js 73, an ECMAScript (JavaScript) program. ActionFind.js runs in the context of the browser. As depicted, it is provided by service provider 24, although an acceptable alternative is for the comic artist to write his/her own script to interact with the service provider's system. ActionFind.js collects metadata from the comic strip digital images, as well as content viewer identification and content host identification. This information is submitted to the service provider's web service interface 74.

In this embodiment, web service interface 74 is the front end to core processing represented by service provider optimization engine 75. In other words, it passes the information accepted from ActionFind.js to the optimization engine. Those skilled in the art understand that the web service interface can also glean a variety of data from the network traffic itself. For example, this data can be the type of browser, a gateway IP address, etc. This information is submitted to optimization engine 75 as well, which uses the submitted information as input into rules-based and statistically-based processing to match the optimal list of actions to present to the content viewer. Those skilled in the art understand that there are a variety of products in the marketplace that can serve as statistical analytics engines; there are others that can serve as rules engines. Those skilled in the art will also understand that rules engines and analytics engines are, in essence, vehicles for executing simplified programming models, and that any program that can be encoded using such tools may also be encoded using more traditional methods. That is, the art associated with the optimization engine is not how it is built, but rather the function that it performs. This function is to select actions 750 that the comic strip artist would like to provide to the content viewer appropriate for the comic strip digital image. See actions below for more details about these actions and examples of the information which the optimization engine might utilize to select relevant actions. Of note, each item in action list 750 includes a display information (e.g., product name, product description, product price), as well as a hyperlink that allows the content viewer to begin the process of starting the action.

Continuing the discussion of FIG. 7, the optimization engine 75 returns its list of actions to the web service, which conveys them to ActionFind.js 73, which, having been called by web browser 71, marks pictures with actions 750. Imagine in this case that there are three items in action list 750 for ComicStrip.jpg (an instance of 201, a comic strip presented on the website): print comic on T-shirt, print comic on a mug, send comic to phone. When content viewer (21) moves his/her mouse over ComicStrip.jpg, his/her web browser 71 conveys user-friendly text items in the action list. The consumer selects the action "Print on a T-shirt." As depicted in 751, the action corresponds to a hyperlink hosted by service provider 76, though of course the hyperlink might just as easily have pointed to the T-shirt printer directly. In any event, service provider action processor website 76 returns form 713 to the web browser that asks the content viewer for additional information, and then redirects the web browser via 712 to Custom T-Shirts Incorporated website (771), which handles fulfillment processing. Custom T-Shirts Incorporated provides periodic fulfillment transaction status 771, which the service provider uses to settle with the artist.

Those skilled in the art will realize that there are a variety of alternative implementations. For example, ActionFind.js 73 could be implemented to act on all comic strips on a page at once, or act on them only when the content viewer moves a mouse over the comic strip. Also, it is possible to have different implementations of 73 coexisting simultaneously, serving different user experiences optimized for different sites, or different mobile devices. The artist site 72 could interact directly with service provider action web service 75 instead of using 73. Interaction 711 could result in a DRM systems integration, instead of a simple web form.

Those skilled in the art will also recognize that a variety of data entry tasks used to support the activities exemplified in FIG. 7 do not warrant detailed explanation. For example, it is obvious to create a service provider data entry application that enables a content host or content owner to assign actions to products, or to register themselves on the service. Similarly, a system to provide reports to content hosts or content owners is also a well-understood problem. Those supporting systems, while not described in detail, are still essential to the implementation of the invention.

Additionally, while FIG. 7 depicts a single flow through the system, it is an essential property of the invention that a single service provider can simultaneously serve multiple content hosts and content owners and action providers.

Actions

The master list of available actions is controlled by service provider 24. The advertising of those actions in the user interface may be accomplished by the service provider using the code that the website host includes on their web page. It may also be accomplished by the website host, who may request an optimized list of actions for a specific image and then render those actions in any manner in which they choose. New actions can be added at any time by service provider 24 (FIG. 2) when business terms are worked out.

Often, a subset of actions may be shown rather than all possible actions. This is both to make the best use of available space on screen and keep the offer/action set usable, and to optimize the performance of the system. For example, offers and actions may be selected to achieve the highest total revenue, the greatest service usage rates, or to gather data about how interested viewers are in some of the newest offers and actions. The specific subset of actions shown may be determined by both the service provider and the host. A partial list of inputs that might determine which actions are shown:

The media type (photograph, video, audio). For example, all 3 types might be burned to CD, but only photographs can be ordered as 3×5 prints.

The media quality. High resolution photographs might be eligible for poster-size printing, while low resolution photographs might not.

Media metadata. A photograph whose EXIF header includes a copyright statement might not be eligible for re-licensing.

A permissions list. The content owner, content host, or other party might specify certain actions as permitted or prohibited.

The context in which the media is displayed. For example, certain websites may sell more prints, so prints are shown preferentially when the media is hosted on those websites.

User history. The user may be more likely to order prints, causing those actions to be shown preferentially.

Business logic. Certain actions may drive higher margins or be subject to promotional agreements; those would be shown preferentially.

Content viewer preferences. The content viewer may explicitly request to have "send to my phone" shown as an option for all images, or to never be offered poster prints. This user preference may be expressed at the website, through browser settings, or elsewhere.

Transaction history. For example, a particular piece of media may sell more as prints. Another piece of media may fare best when only a single action is provided, rather than a list of options. This may be determined manually or programmatically, by the website, the service provider, or elsewhere.

Explicit override. The content host, content owner, or service provider might explicitly wish certain offers to be made available, independent of other heuristics. Alternatively, a content viewer might ask never to be offered certain items.

Action Provider quality. For example, if certain photo processors result in a large number of customer complaints or failed fulfillment transactions, their actions may be excluded from the options available to content viewers.

In many cases, actions that are largely ignored and unprofitable in comparison to the others are dropped. Over time, the content interface shown everywhere across all websites can be optimized for content viewer satisfaction and maximum revenues for all the parties involved.

Note that some image analysis and manipulation algorithms are computationally expensive, and recommendation and set optimization algorithms are varied and often based on lots of data analysis and computation. In order to attain a good cost/performance balance, some embodiments of the service may perform simple image metadata, viewer history and/or host preferences analysis for the bulk of requests made. More computationally expensive or storage-hungry image, user history, and provider history analysis can be performed for those requests pertaining to images which are viewed the most or generating the most revenue, related to users who are heavy users or purchasers, or hosts that have signed up for a premium service. The service may also selectively perform more computationally expensive offer/action subset selection algorithms in the aforementioned cases. Finally, the service may selectively generate more accurate (e.g., photo-realistic) representations of product offers, or otherwise provide an improved presentation and interaction experience to the viewer in the aforementioned cases.

For the sake of illustrating the concept, here follows descriptions of some actions that make sense for image media. Note that this is not an exhaustive list, but rather is provided for illustrative purposes.

Print this image via on online printing source (e.g., KodakGallery.com) and mail it to my house Send this image to a phone (via MMS)

Email this image to someone

Print this image with all the appropriate options for photographs via my own home printer Use this image as the background image on my PC Use this photograph as an input to PC software (for example, as an avatar in a video game)

Import this photograph in to an album (on another website or on local PC software, for example)

Add this photograph to my screen saver, or make me a screen saver from a collection of photographs from this website Order merchandise with this photograph on it (t-shirts, mugs, stickers, gift-wrapping paper, stationary, calendars, key chains, business cards, etc.)

Order a poster

Send a photograph postcard of this image to someone with a text message

Order a large framed print (or even a print on canvas)

Order a DVD with a slideshow of the images I choose (works as an archive as well as something that can be viewed on a television)

Save a digital copy of this photograph in a size of my choice

Obtain redistribution or publication rights, potentially in conjunction with a higher resolution version or version without a watermark Subscribe to an RSS feed of this and related images (for example whenever new images are added to the existing website with the same account properties, those appear in the content viewer's RSS reader)

Add an image to a list (wish list, shopping cart, component of a collage)

Vote for the image (e.g., American Idol voting)

Mark an image as interesting

Mark an image as inappropriate

Personalize the image, for example in preparation to do something else with it (e.g., put text on it, then order it as a postcard)

Comment on this image

Add a text "tag" to an image

Tag people in an image with their Facebook or MySpace accounts

Not all actions need have fees associated with them. Content viewers may be able to mark certain actions as their favorites and have easiest access to those. Content owners or hosts may opt out from certain actions and only allow a subset of actions for their content (e.g., a wedding photographer would allow framed prints for $10 for 5×7 prints, but may not allow any home printing of their photographs).

For some of these actions, codes may be used on the content viewer's PC. The first time such an action is chosen by a content viewer, the download of such code (called a client) is easily facilitated by the web user interface provided by the service provider.

As mentioned above, the enhanced interface for media shown by the service provider can also control the display of the media and all interactions with the media. Thus a richer viewing experience can be offered over the default for the content viewer's browser (e.g., slide shows, zooming, overlayed information like tags and comments from other viewers, ratings or labels set by the content owner and much more can be offered in the enhanced presentation). It may also be more limited, e.g., restricting high resolution-images or introducing watermarks to the images. Such a customized interface is also helpful for implementing limits on what users can do with content owned by other people (e.g., if emailing or home-based printing is not allowed for certain images, the limited custom UI ensures it is very hard to work around the limitation and cheat on the rights).

A combination of heuristic techniques may be implemented to make sure that only appropriate actions are allowed and the user interface is made available only on appropriate content. E.g., tiny images used in the artistic design of web pages should universally be skipped, DRM-protected or copyrighted content may also be skipped (or many of the normal actions disabled) unless the content owners tagged the photographs with their content owner account. GIF images may have different actions available than JPG and/or RAW images. A photograph may have Creative Commons license info entered in the EXIF header that restricts the actions made available to content viewers. As stated above, the content host and/or owner may have opted out of certain actions or set fees for certain actions. Ratings, tags, or inappropriate content flags set by other viewers may also limit actions. In one very specific example, the photograph may be flagged as inappropriate for children, and the payment processor may have the content viewer's account flagged as a child; the intersection of those two pieces of information results not only in no actions being made available, but also in the image itself being hidden from view.

Accounts

In the preceding paragraphs it is explained that content owners and content hosts can create accounts with the service provider and will often do that as a first step. While this may be necessary to pay transaction fees and provide secure access to usage reports related to a particular party's website or content, it is also desirable from the content viewers' and service provider's point of view to also allow redistribution of the enhanced media experience without an account. In this way, the "bar" for redistribution is as low as possible, and the improved experience can spread even faster. Generic versions of the Javascript could be added by anyone to any website to provide the "default" enhanced media experience.

However, an account is not required. One example is that the invention may be implemented in the default version of bulletin board software. Such software (e.g., vBulletin) allows a host to quickly create an interactive online discussion. Actions may be available by default, with no account being created (and no compensation given to the host). Then the host might later create an account and claim compensation for future (and, possibly, past) actions. In a variation, the software might use a default account (benefiting the software authors). A deploying host might not be able to change the account, or might be required to upgrade before doing so.

Similarly, Internet users who appreciate the richer selection of media actions provided by the invention (both the free and the paid actions), may want the same experience available wherever they go on the Internet. Other distribution mechanisms besides having content hosts update their HTML could enable this scenario: e.g., end users could install a GreaseMonkey script or browser plug-in to enable the enhanced user interface for all images they come across on the Internet. In these kinds of distribution models, explicit or heuristic techniques may be implemented to make sure that only appropriate actions are allowed and the user interface is made available only on appropriate content. E.g., tiny little images used in the artistic design of web pages would be skipped over, and DRM-protected or copyrighted content could also be skipped (or many of the normal actions disabled) unless the content owners tagged the photographs with their content owner account.

Content Owner/Content Host Actions

The content does not need to be hosted on a web page; it might be hosted in a software application, such as photograph organizing software (e.g., Picasa) or a game (e.g., Doom).

In some embodiments of the invention, a content owner or content host with an account with the service provider may be presented an expanded in-place user interface for their own content when they view it. That is to say, in addition to the content viewer actions for images on their website, the owner of the website may see all of those actions and a special set of content owner actions and information. The revenue performance and usage statistics can be shown for the image in question, options to disallow certain actions or change prices for actions can be made available, etc. This special set of UI could be shown based on a cookie stored in the account holder's browser, or via an explicit "log in to my account" choice made available on the enhanced content UI.

Other implementations may simply show the same content viewer UI to everyone in context with the media, and have account holders log in to a management website explicitly when they want to view data specific to their account or make content management choices.

Advertising

It's possible that one of the action providers ($25_{1-p}$ in FIG. 3) or the service provider itself would associate advertisements with the image, potentially using image analysis, image metadata, or other means to target the ads. Buildings or construction might generate ads for construction, real-estate, or home-owner services. GPS data attached to the image could generate local ads. EXIF information that explains the model of camera used to take the photograph could produce an advertisement for the same camera that was used to snap the photograph being viewed. This image analysis could be combined with analysis of the text on the web page in which the photograph is embedded (and text in any comments or tags on the photograph).

The UI provided by the service provider could include displaying one or more relevant ads immediately, at the moment the content viewer's mouse moves over a photograph, or it may wait to display an ad for a few moments, immediately before a free action is taken pertaining to the photograph. Ads may be shown over, next to, or separately on the screen from the image. Revenue from advertising can be shared with content owners and content hosts. Content owner and content host preferences may ask to explicitly opt-out from showing advertisements related to content on the site.

Tags & Sets

Some actions enabled for photographs require several photographs to be selected by the photograph viewer (e.g., a calendar that requires a photograph for each month of the year). The set offered to the viewer for his/her selection immediately after one of these actions is chosen can be constructed of all the photographs on a particular web domain or page, all the photographs corresponding to a particular content owner or content host, or better yet, all the photographs on the current website that have the same specific text tag or "photo set" name. This can easily be implemented as a second attribute/property on the IMG tags in the HTML code. This support for photo sets allows content-rich websites to tag their IMG tags with album names, account names, blog category names, or anything else—and the enhanced photograph interface and aggregated set of actions works seamlessly with these defined photo sets.

Media Aggregation

Much of the preceding description has focused on the presentation or actions that could be made available with the photograph or media item itself, in its current distribution channel. Additionally, all media items recognized by the service provider (e.g., viewed with enhanced UI by at least one person, or crawled by a search bot) could also be made available for distribution through an alternate site. For example, iStockPhoto sells photographs to be used in corporate marketing materials. If every photograph on every web page that has been tagged by a content owner with an account at the service provider could be seamlessly offered for sale through the iStockPhoto (or some similar) website, and the proceeds shared with the content owner, that would be beneficial for the people searching for images and beneficial for the content owners who now earn extra money. In another example, a t-shirt website could aggregate all images that had a certain number of t-shirt orders.

DRM

In addition to presenting enhanced actions and controlling the user experience for media items, the invention can enforce digital rights management (DRM) capabilities universally across multiple sites. In the simplest case, certain actions such as copying, saving, and printing of the photograph are not offered (and may even be precluded if the browser or host environment supports it) without explicit permission (and/or payment) to the content owner. The photograph shown on screen could be a placeholder image compared to the full fidelity copy. It could extend further to ensure that any copies purchased and saved to content viewer's computers were marked with the correct digital rights so that only approved actions could be taken even after downloading to a different computer.

Transactions

Transactions can be free or for a fee and can be handled by the host, perhaps with payment, handled by a trusted third party such as PayPal, or a wireless carrier. Payment can be handled in the web storefronts of the merchants that the service provider connects to for the action in question. Payment can be real or virtual currency or barter—for example, sharing one photograph gives the right to download two more. There are various advantages to these differing implementations, from reduced data entry and clicking required on the part of the content viewer in the case that the service provider or at least a trusted third party billing system handles the transaction with the customer, to extreme speed of implementation and integration with action provider companies when they handle the transactions and the service provider just sends extremely direct leads. Transactions need not even happen directly in national currencies. They could happen based on points and specific systems for spending points.

Constituents in the system are incented to sign up for accounts with the service provider in order to be able to receive income from their content. Any end user who uploads photographs for safekeeping or sharing may earn a few dollars from prints made by their friends and family. You can participate in the ecosystem while being anonymous, but to get paid, you have to have some kind of credentials. The same account might be used for purchases and deposits. Once they have an account that is linked to a payment system, they are enabled for instant gratification in terms of photograph actions and purchases as well. Also, payments could be split among multiple parties. For example, compensation could go to the action provider, the operator of the action finder, the host, the rights owner, and even some other parties—for example, a referral fee to someone who signed up the host in the first place.

Smart Rendering

Based on the browser or medium in which the photographs are presented, the enhanced UI may be rendered quite differently. For example, if the content viewer has a modern browser on a capable machine, a full interactive Flash-based interface may be provided. If a different content viewer pulls up the same page on a mobile phone, a few extra HTML or WAP links may be presented instead as more appropriate to the browser being used, or number keys on the phone could be mapped to particular actions. If the photograph is instead embedded in an RSS feed, rather than HTML—again a few simple links or a small additional image or two next to each photograph may be more appropriate.

System Design

Figure 4:
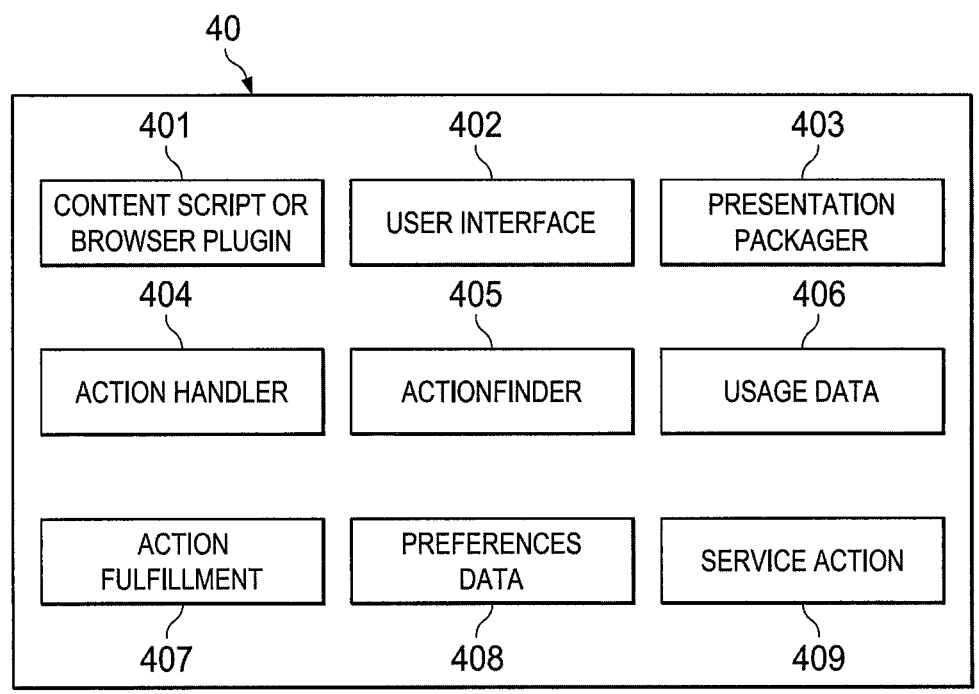
FIG. 4 depicts one embodiment of a software architecture for controlling the implementation of the concepts discussed herein.

FIG. 4 depicts one embodiment 40 of a software architecture that could provide this invention. As shown, several components may play a role in service provider architecture for supplying an enhanced media interface and executing aggregated external actions. In one embodiment of the invention, JavaScript or browser plug-in 401 runs on a computer under control of code stored on a tangible medium at service provider 24 such that when content viewer 21 views a web page, typically at content host 22, containing media the script then communicates with the service provider's Internet service in order to retrieve UI 401 that is shown to the user.

Presentation packager 403 starts by considering the "default" view that should be constructed based on the media itself and the most used and greatest revenue generating commands across the network (this information is retrieved from usage data module 406). If advertising is to be used, a link to the photograph and the photograph's host web page is supplied to a third party in order to retrieve the advertisements. The presentation packager also asks action finder 405 for all the actions in the list. Some of these actions may not be operational with the third party action providers, others may have been opted out with respect to a particular media. this media item, this media set, this content owner, or this content host. All of this is then bundled up by the presentation packager and returned as the user interface for the image in question. The UI code is asynchronous, and does not block rendering of the container web page or viewing of the content while it's retrieving information from the service provider.

When an action is chosen in the UI, it goes through the action fulfillment 407 API (again, hosted by the service provider). Some actions are fulfilled directly by the service provider service, whereas many others are fulfilled via external connections to action provider Internet services. Preference data 408 is unique to the user and/or the rights owner and serves to configure the presentation packager. Service action 409 coordinates activities with other vendors.

Business Models

Many variations are possible with reference to FIG. 3. Content host (22) operates a photography website that hosts images submitted by amateur photographers (23) (alternately: professional photographers (not shown) represented by agents (also 23); alternately, these images are in turn embedded in a website such as a social network operated by an entity not shown here). The content host contracts with service provider (24) to help them monetize those images. The service provider offers a number of different monetization options from action providers 25.

Each photographer specifies which actions are permitted (or banned), for example, enabling prints but disabling sublicensing of the image for other works. The content host further filters the list by deciding which actions are unavailable or always available on the website. When a viewer (21) visits the web page operated by the content host, they see photographs and a variety of actions. The actions are determined by the service provider given a host of inputs including photographer and content host preferences.

If the viewer opts to order a print, the request is made in the context of the content host's web page. It is submitted to the content host who relays it to the service provider (alternately, directly to the service provider). The service provider determines what additional information, if any, is needed, optionally by consultation with the action provider—for example, billing information. The service provider obtains this information by looking it up in a database (alternately, notifying the content host to fetch the information; alternately, modifying the page being viewed directly to request the information; alternately, requesting the information from the action provider). The content viewer pays a fee to the content host (alternately, the service provider; alternately, the action provider). The fee is apportioned, with percentages going to the content host, the service provider, the content owner, and the action provider. Some parties may not receive payment; other parties might be added. Fulfillment is then the responsibility of the action provider, e.g., shipping the print, and may involve direct interaction between the action provider and the content viewer. The service provider (alternately, the content host) tracks what requests are being made and what information and funds are changing hands so that reconcilement and auditing may occur.

- Content viewers (21) pay for merchandise or value added actions taken w.r.t. media. Some actions may be free. Note that the content viewer may also be the content owner/creator, as when someone orders a print of their own photograph.
- Payment for some kind of merchandise or premium actions can be collected directly by the service provider (24).
- In this case, the service provider can provide service for some actions directly, bearing the cost of providing, and charge enough to make a profit.
- For other actions, the service provider has negotiated lower rates from suppliers and charges users a mark up for providing the convenient experience, collecting payment, and facilitating the order/action.
- As an alternative, this service provider can simply match up the customer (21) and vendor/action provider (25).
- In this case vendor/action provider (25) collects payment for the service rendered or perhaps even outsources that to PayPal or another third party.
- Vendor/action provider (25) pays service provider (24) for the referral. This could be a percentage of the revenue generated by the referred order, a flat bounty on lead generation, etc.
- In either case, service provider (24) may pay a small share of the revenue it has earned from any given transaction to content host (22) or content owner (23).
- In a different model, most actions are provided free of charge to content viewer (21), and revenue is made from advertising compensation shown to content viewers (21).
- Hybrid models are also possible: advertising can be shown along with actions, and those advertisements monetized in the usual way (payments going to the service provider (24). Revenue shares from advertising revenues could also be paid to the content host or content owner.

Independent from the transactional based fees and revenue sharing documented above, the following can be achieved, if desired.

Content hosts (22) could be required to pay a small "developer license fee" to receive an account and be eligible for the revenue share payments generated by their content viewers (21).

Content owners (23) might have free basic accounts and be urged to upgrade for a richer feature set around account tracking, reporting revenue per content, more timely payouts, etc. Upgrading to a paid account might be required if they do more than a certain volume in transactions.

Action providers (25) could pay for premium placement in the user experience.

Summary

Federated distribution of an enhanced user interface for media and aggregated set of relevant actions.

Allowing separate website host, UI presenter/action aggregator, and action provider companies.

Configurability such that each website owner chooses the actions it wants to reveal on all of owner's photographs.

Determination of the appropriate display and actions to show for a given image using multi-part rules/characteristics.

The smart rendering idea discussed.

Inclusion of photographs in special searches or galleries via the tag.

Pictures rather than just text.

Using a generic piece of HTML to create an account.

An important operational characteristic is that the API can pass the picture from one location to another as a parameter of the message.

Applying one script to the page or a specific blurb to each photograph.

Figure 5:
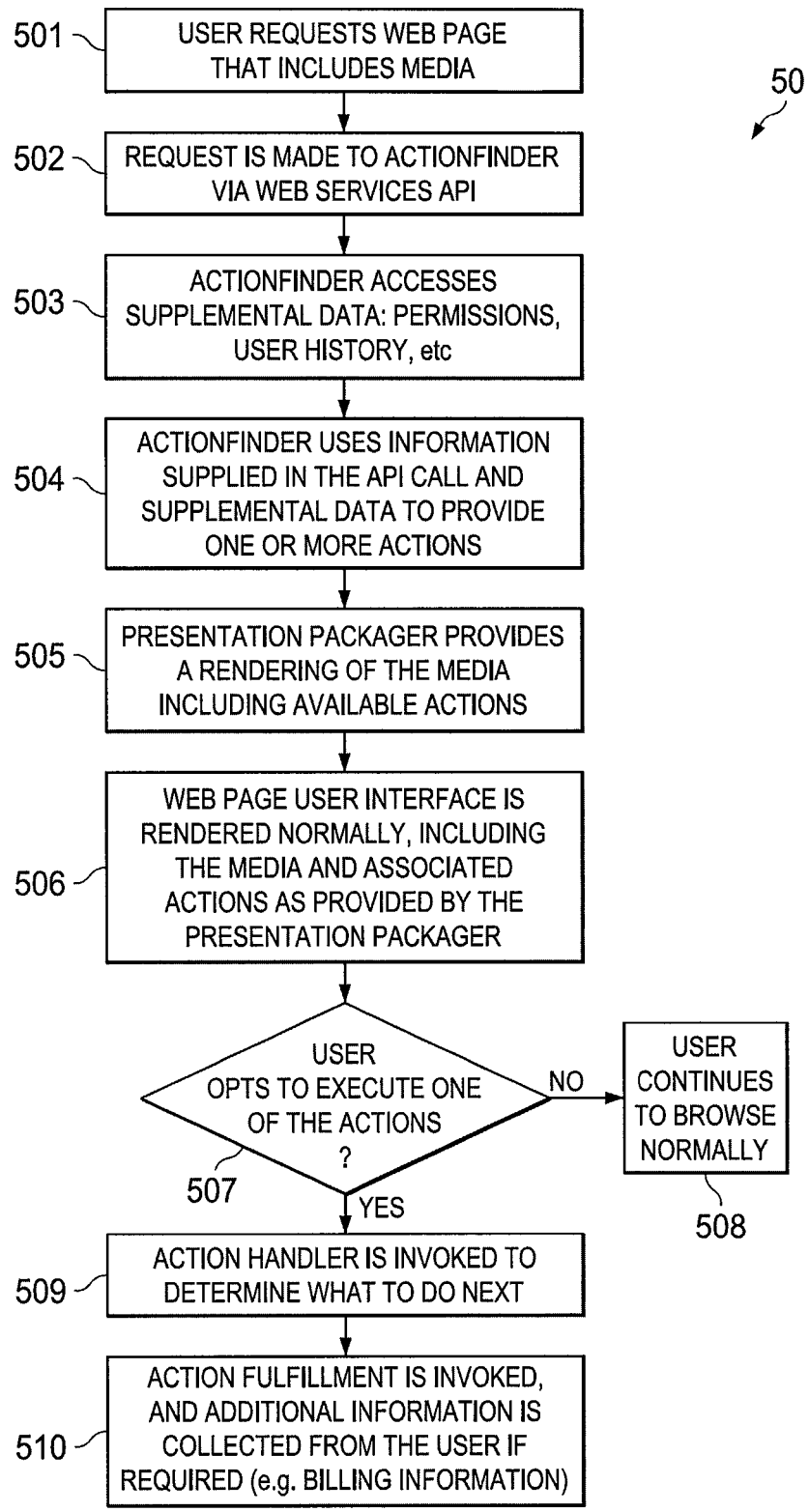
FIG. 5 depicts a typical information flow for a user of the concepts discussed herein.

FIG. 5 depicts method 50 of a typical information flow for a user of this invention. Process 501 accepts a user request at a web page that includes a desired media. This request results in the user being able to "see" the selected media on a user device connected to a network site selected by the user and in some cases is controlled by user interface 402 and script 401 (FIG. 4), if necessary.

Process 502 makes a request from the selected site to actionfinder 405 (FIG. 4) located in or under control of service provider 24 (FIG. 2) via a web services API which is part of the application program downloaded to the selected site by or on behalf of the service provider. This allows all sites to operate in the same manner with respect to any user.

Process 503 causes the actionfinder to accesses supplemental data: permissions, user history, credit information, special instructions, passwords, etc., all stored in a database, such as database 240 (FIG. 2).

Process 504 causes the actionfinder to use the information supplied in the API call and supplemental data to provide one or more actions. Some of these actions can be with respect to third party providers, such as provider 25 (FIG. 2). When third parties are involved, service provider 24 can in the appropriate situation log on in the user's name and transact whatever business is required. Sometimes the access to the third party is in the name of the service provider and any costs are billed to the user (or absorbed by the service provider or host site) depending on prior arrangements.

Process 505 uses presentation packager 403 (FIG. 3) to provide a rendering of the media to the host site on the user's behalf and would include all available actions as requested by the user. The user requests could be made during the most recent access or could have been stored from previous requests or could be based on previous actions taken.

Process 506 controls a web page user interface to be rendered normally regardless of which site the user selected. This rendering includes all media and associated actions as provided by the presentation packager.

Figure 6:
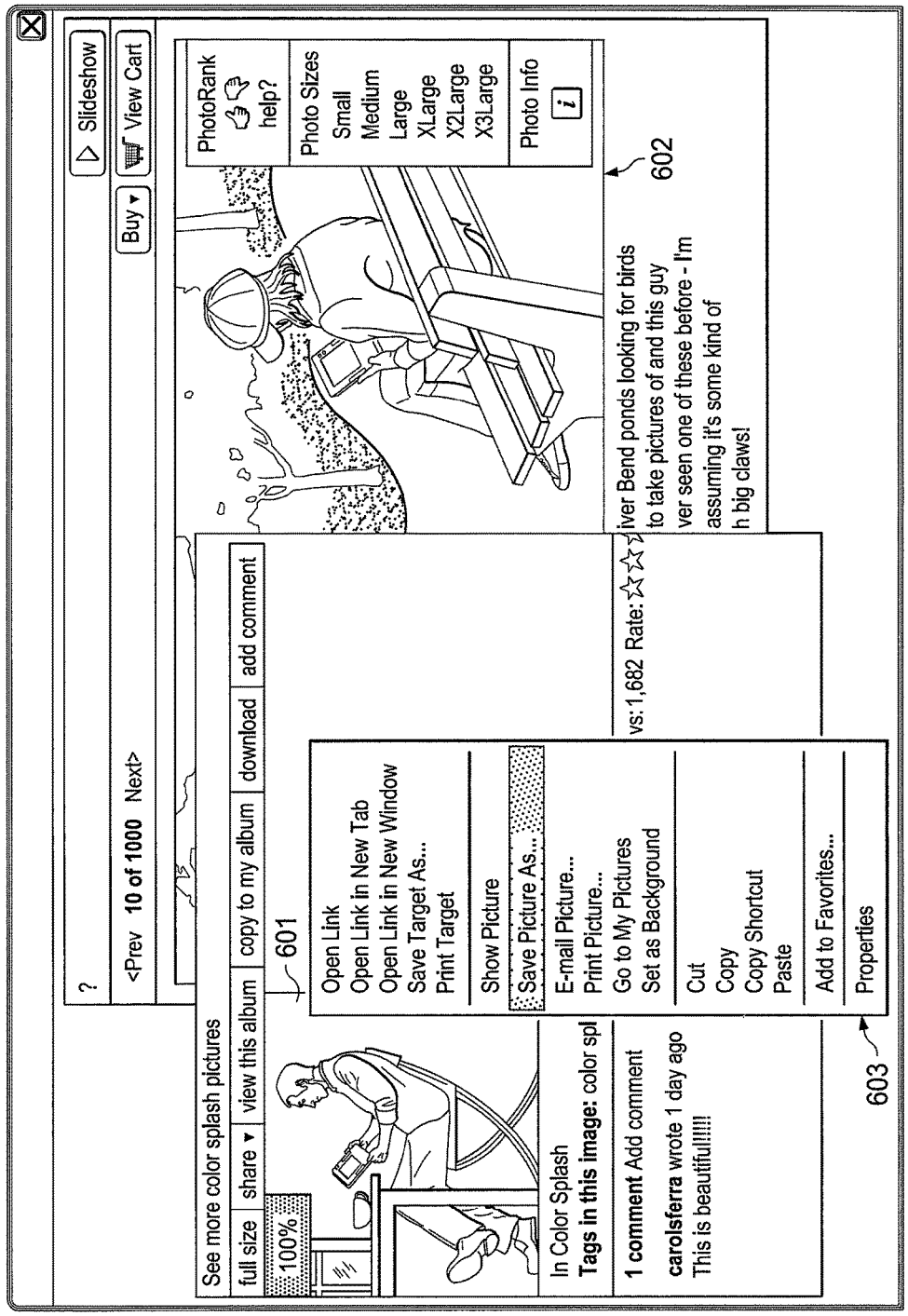
FIG. 6 shows one example of a prior art implementation of a website presented image.

Process 507 allows a user to opt to execute one of the actions. If no action is taken by the user then the user continues to browse normally. If the user selects a presented action then process 509 invokes action handler 404 to determine what to do next based on the user selected actions and a database that controls how those actions are to be carried out. This may involve action fulfillment 407 via process 510 and additional information may be collected from the user if required (e.g., billing information). Also, preferences data 408 and service action 409 along with usage data 406 may be involved as well FIG. 6 shows prior art with respect to two images 601 and 602. On existing websites, the owner must program into the website a list of options, such as shown in option box 603, for photographs, defined, determined, and presented by the website owner. Additional options are made available through the browsing client, in this case the right-click menu in the web browser. These options are determined by the browser provider at compile time. This system is cumbersome and does not promote uniformity among sites and hinders multi-site use.

In some embodiments, features of this invention are:

1. Aggregating offers/actions from multiple external offer provider systems and presenting them in a single UI.

2. Optimized selection of the offers/actions from offer sets available from multiple offer provider systems (e.g., based on aggregated purchase or click history).

3. #1 and #2 made available to an arbitrarily large number of independent 3rd parties.

4. Enhanced functionality of any kind for web images made available to an arbitrarily large number of independent 3rd parties via a drop in script and simple HTML "tagging" of images meant to have the enhanced functionality.

5. Enhanced functionality of any kind for web images made available to end users for all Internet image content (e.g., as a browser plugin or stand-alone application the user would install).

6. Optimized selection of offers/actions for a specific image, specific publisher website or application, or specific presentation format (e.g., HTML in a PC browser, versus mobile application, versus RSS feed).

7. Optimized selection of offers/actions for a specific user, their click and/or purchase history, their demographics, etc.

8. The idea of having special searches or galleries available across all "covered" or "tagged" images across the Internet at large. E.g., you could create a store based on content all publishers have chosen to make actionable via PhotoWrapper.

9. Selective use of enhanced analysis of some images, publishers, or users for even better financial performance. This enhanced analysis would be fed into offer/action selection algorithms to improve performance. Selective use of the enhanced functionality would be based on image, publisher, or user viewing volumes or revenue potential. Those with the greatest potential would get more intensive processing. The advantage here is better financial performance while also using service resources most effectively.

10. Selective use of more computationally intensive selection algorithms or composition/renderings of offers for even better financial performance based on image, publisher, or user viewing volumes or revenue potential. The advantage here is better financial performance while also using service resources most effectively.

11. Optimized presentation of offers for a specific image, specific publisher website or application, or specific presentation format (e.g., HTML in a PC browser, versus mobile application, versus RSS feed). E.g., text links could be presented on certain publisher sites where a minimally invasive look does best, large graphical offers could be presented for a publisher with a busier look. Different presentations could be presented to Mac users than PC users.

12. Optimized presentation of offers for a specific user, their click and/or purchase history, their demographics, etc. E.g., text links could be presented for some users, large graphical offers could be presented for other users.

13. Optimization of not just the offer set, but the prices and text used for each individual offer (e.g., the 3rd party publisher doesn't do any inventory management).

14. Optimized presentation of offers for any given publisher or user based on experimentation and performance of presentation styles across other publishers or users.

15. The above systems coupled with publisher control over allowed offer provider systems and/or offers.

16. The above systems coupled with offer provider control over allowed publisher sites.

17. The above systems coupled with a model for independent "content rights holder parties" to accept revenue from the transactions, or block specific actions or offers from appearing for their content.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of managing a plurality of independent websites, said method comprising:

delivering to each of said independent websites, from a service provider common to said plurality of independent websites, a software application operative for independently running on each respective server hosting each of said independent websites;

said application operative for performing at least the following steps:

allowing a media rights owner to control marking of an image to indicate products that can include said image, said image being owned by said media rights owner and said image being presented to a user on one or more of said independent websites for said marking;

presenting on one or more of said independent websites, in a single user interface, with said image, a list of said products that the user can order to include said image, each product directing, via a hyperlink, the user to a third party provider that provides said product;

allowing said user to access a particular one of said independent websites to select, from a menu, at least one of said list of products said user can order to include said image, said particular accessed independent website using the same user interface regardless of which independent website, of said plurality of independent websites, said user accesses; and processing a product selected by said user to include said image in a particular fashion regardless of which website, of said plurality of independent websites, said user accessed, wherein said product is provided by one of a plurality of third party providers, said plurality of third party providers being coordinated through said service provider;

wherein said service provider is operable to receive from said plurality of independent websites, through said application, information related to a characteristic of at least one product of said list of products and, in response to receiving said information, determine, based on said characteristic, whether said at least one product is included in said list of products.

2. The method of claim 1 wherein said control by said media rights owner is coordinated through said service provider regardless of which website presents said media rights owner's media.

3. The method of claim 2 further comprising:

providing, under control of said service provider, specialized treatment on a user by user basis depending upon a selected website, of said plurality of independent websites, and depending upon profile information pertaining to said user.

4. The method of claim 3 wherein said specialized treatment is selected from a list of: special offers, messages, instructions, pricing, selected action providers, selected actions.

* * * * *